United States Patent [19]

Laseter

[11] 4,376,601
[45] * Mar. 15, 1983

[54] MATERIAL CONVEYOR

[76] Inventor: Douglas E. Laseter, 5115 Old Canton Rd., Apt. K-7, Jackson, Miss. 39211

[ * ] Notice: The portion of the term of this patent subsequent to Dec. 18, 1996, has been disclaimed.

[21] Appl. No.: 179,162

[22] Filed: Aug. 18, 1980

[51] Int. Cl.³ .............................................. B65G 53/46
[52] U.S. Cl. .................................... 406/64; 222/346; 406/63
[58] Field of Search ...................................... 406/63–68; 222/346, 347, 367, 636; 414/219

[56] References Cited

U.S. PATENT DOCUMENTS

| | | | |
|---|---|---|---|
| 2,740,672 | 4/1956 | Morrow | 406/63 |
| 3,492,050 | 1/1970 | Colinet | 406/63 |
| 4,111,493 | 9/1978 | Sperber | 406/64 |
| 4,179,232 | 12/1979 | Laseter | 406/67 X |
| 4,234,272 | 11/1980 | Laseter | 406/67 X |

*Primary Examiner*—Jeffrey V. Nase
*Attorney, Agent, or Firm*—Shoemaker and Mattare, Ltd.

[57] ABSTRACT

A device for conveying measured amounts of material which includes a rotating induction wheel having a plurality of elongate open-ended chambers defined therein and a pair of wipers arranged to remove excess material from the chamber ends. Brackets seal the chambers, and gas is introduced into the chambers to pulse the material out of the chambers into a material transport conduit. Metered charges of material are thus delivered to the transport conduit. The wipers are integral with the brackets.

4 Claims, 4 Drawing Figures

MATERIAL CONVEYOR

BACKGROUND OF THE INVENTION

The present invention relates in general to conveying granular material, and more particularly, to conveying metered amounts of granular material.

Many systems employ granular or pulverulent material. Examples of such systems are dry cement handling systems, hopper container unloading systems, gravel conveying systems, and the like.

Some of the systems used to move granular material from one location, such as a hopper or other storage device, to another location are required to deliver such granular material in metered amounts. The metered amounts can take the form of a controlled flow rate or the form of metered charges.

The inventor is aware of several devices which deliver metered amounts of granular material. Examples of such known devices are disclosed in U.S. Pat. Nos. 2,740,672, 2,890,079, 3,009,744 and 3,268,266. While all of these devices disclosed in these patents are somewhat efficient, they all suffer from drawbacks resulting from inefficient and inaccurately delivered material. The size of the charges of material delivered by these devices often varies beyond the limit required for great accuracy, and such inaccuracies are not easily corrected, if they are correctable at all. Furthermore, some of the granular material delivered to these devices may be crushed by the device. Such crushed material may cause inaccuracies in the processes using the material delivered by the device.

SUMMARY OF THE INVENTION

The device embodying the teachings of the present invention is similar to the devices disclosed in U.S. Pat. No. 4,179,232 and U.S. patent application Ser. No. 949,338, filed on Oct. 6, 1978 by this inventor, and issued on Nov. 18, 1980 as U.S. Pat. No. 4,234,272. The disclosures of these two documents are incorporated herein by reference thereto. The device of the present invention comprises a hopper body, and granular material enters that body through the top thereof. An induction wheel is mounted within the hopper body to rotate in the vertical plane in a direction opposite to the flux of granular material. The wheel scoops up material from a reservoir formed on the bottom of the hopper by the inflowing material, and carries that material upwardly. The wheel includes a plurality of elongate ladle-shaped chambers which are open at both ends thereof and which are loaded via both of the open ends. The chambers are generally overfilled during the transit thereof through the reservoir, and excess material spills out of the chambers through the open ends back into the reservoir before the chambers reach the 12:00 position on the wheel. The speed of wheel rotation, the level of the reservoir, the size of the chamber openings and the like are adjusted so that nearly all of the excess material is spilled out of the chamber during this phase of operation. Such spilling avoids damage to the material.

The device of the present invention includes brackets mounted on the housing and having wipers integral therewith. The wipers are integral with the brackets and are located near the 12:00 position of the wheel to gently remove any remaining excess material located at the chamber ends and protruding there out of.

A pair of air retaining bracket legs are each located on opposite sides of the wheel and contact the wheel after that wheel has passed the position whereat the chamber of interest is at the 12:00 position. The bracket legs seal the chambers.

A pair of longitudinally aligned ports are mounted on the brackets and the gas induction conduit and the material transport conduit are connected to those ports to be in longitudinally aligned relationship, so that the induction wheel is located therebetween. The chambers are sequentially longitudinally aligned with the conduits, and high pressure gas, such as air, or the like, is inducted into the chambers via the gas induction conduit, and exhausted into the transport conduit on the other side of the chamber to force the material out of the chamber into that transport conduit. The material is then transported to a suitable location in that transport conduit.

By being loaded from both ends, the chambers are efficiently loaded, and the spillage therefrom can be controlled to occur in a desired sequential position of the chamber on the wheel, and at desired times in the operation. Thus, the size of the charge contained within each chamber is accurately controlled and spillage therefrom occurs at the most propitious time. The device of the present invention thus delivers precise charges of material and operates in a manner not likely to damage the material so that waste is eliminated, or at least minimized, as compared to prior art devices.

The faces of the bracket legs of the present invention seal the chambers and thus insure that gas is not wasted through leakage out of the chambers, thereby producing efficient and precise use of gas. Such gas usage further enables precise control of charge size, as leakage in the charge moving gas upstream affects flow rates therein, as well as the amount of material actually removed from the chamber. In the limit, maximum leakage may even cause the gas pulse into the chambers of prior devices to fail to remove any of the charge, thereby rendering these devices completely inoperative. The bracket legs of the present invention seal the chambers and thus minimize leakage to maximize the accuracy of the gas pulse delivery and hence the precision with which the charge is removed from the chamber. Precision at the initial point in the delivery process permits the rest of the delivery process to be accurate.

As material in the induction wheel is being carried upwardly, the material spilling out of the chambers is gravity assisted and thus the device of the present invention takes advantage of gravity rather than opposing it. The efficient removal of excess material thus not only improves the precision of the present device over that of the prior art, but has maximum life of the elements thereof, such as the bracket leg faces, due to the removal of abrasive materials prior to contact with the bracket leg faces.

The device of the present invention is quite amenable to use with a large variety of power systems, thereby increasing the flexibility thereof over prior devices.

The device of the present invention is preferably used in a roadway and street repair device wherein charges of gravel are directed into a pothole and then coated with a material to form a pothole plug.

OBJECTS OF THE INVENTION

It is, therefore, a main object of the present invention to convey granular material in an accurately metered manner.

It is another object of the present invention to convey granular material in a manner which prevents excessive waste of such material.

It is a further object of the present invention to convey granular material in a manner which efficiently utilizes the high pressure gas used in the material transport system.

It is still a further object of the present invention to convey granular material used in a device having elements thereof which are arranged to reduce wear and abrasion thereon.

It is still a further object of the present invention to convey granular material using a device having a chamber which is efficiently loaded with a charge of material the size of which is accurately set.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
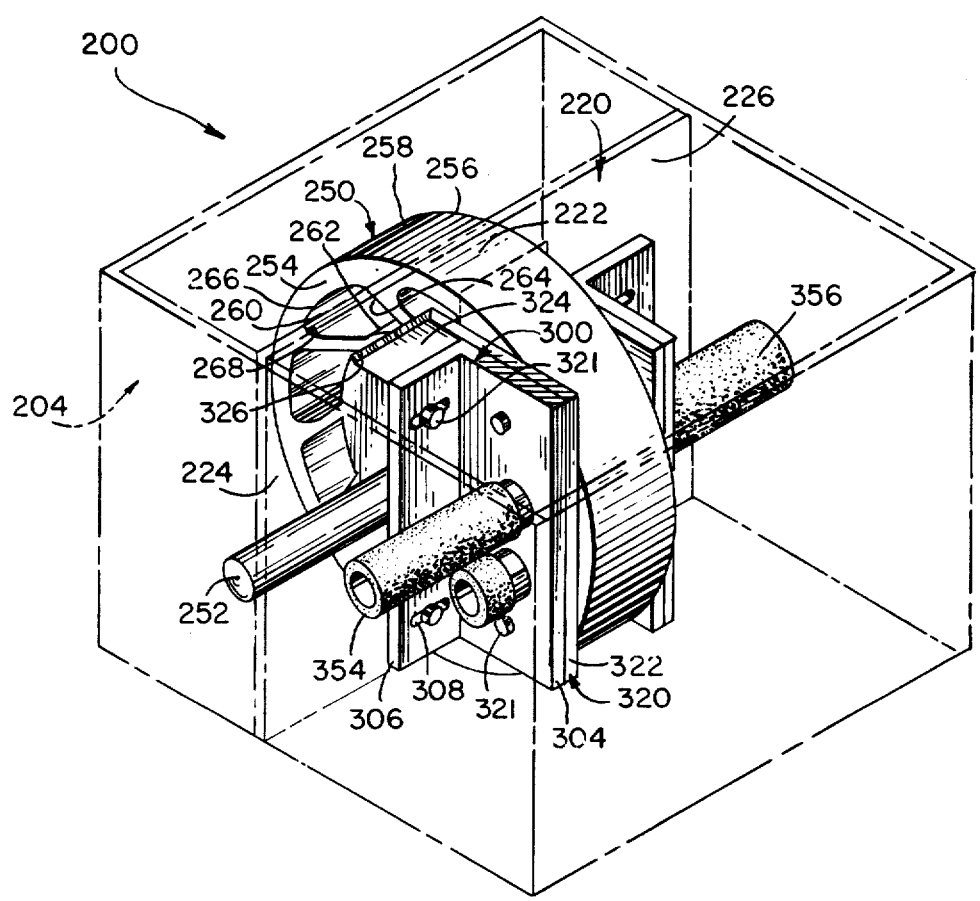
FIG. 1 is a perspective view of an embodiment of a granular material conveying device embodying the teachings of the present invention.
Figure 2:
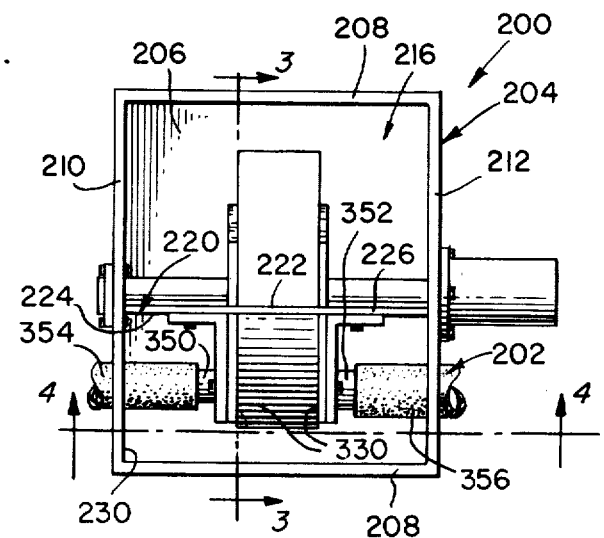
FIG. 2 is a top plan view of the granular material conveying device shown in FIG. 1.
Figure 3:
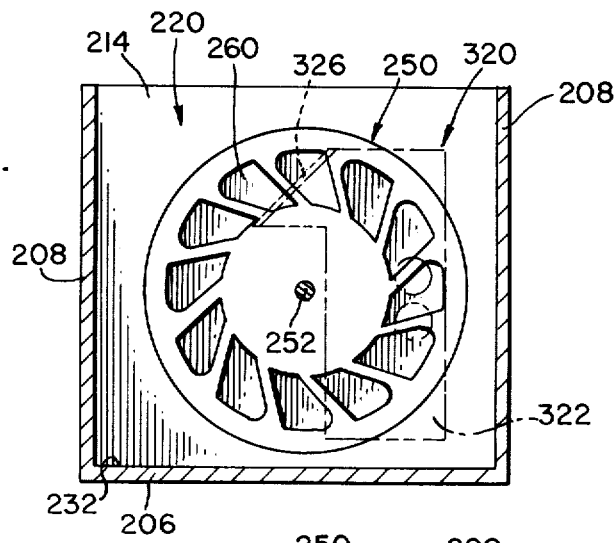
FIG. 3 is a view taken along line 3—3 of FIG. 2.
Figure 4:
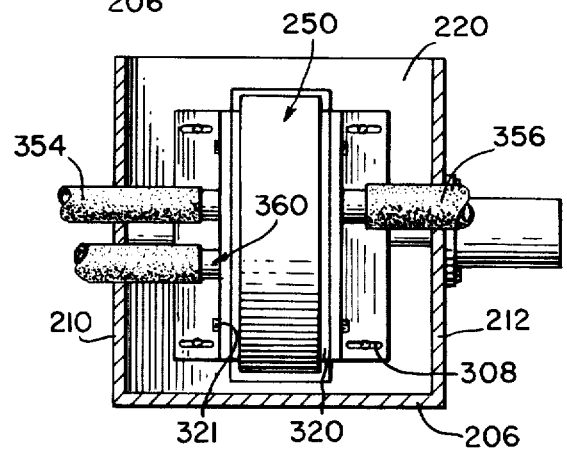
FIG. 4 is a view taken along line 4—4 of FIG. 2.

Shown in FIGS. 1-4 is a metering device 200 which conveys metered amounts of granular material to a material transport line 202. The device 200 includes a housing 204 which includes a bottom 206, upstanding sides 208, a back 210, a front 212 and a top 214. A material entrance 216 is defined in the top 214 near one of the sides 208. Pulverulent or granulated material, such as gravel, or the like, is discharged from a source (not shown) such as a hopper, or the like, into the housing 204 via the entrance 216. The material gravitates downwardly in freefall from the entrance and collects on the bottom of the housing to form a reservoir. The reservoir is located in the lower section of the housing and will be more fully discussed below.

The metering device includes a U-shaped bracket 220 having a base section 222 and a pair of vertically oriented legs 224 and 226. The bracket is mounted along the peripheral edge of the legs on inner surface 230 of the housing and along the outer peripheral edge of the legs on the inner surface 232 of the bottom 206. The bracket 220 is thus securely mounted in the housing to retain the vertical on-edge orientation shown therefor in FIG. 1. The bracket is located to be just off-center and thereby divide the housing volume into two unequal sections.

A vertically revolving induction wheel 250 is mounted on a shaft 252 for rotation therewith. The shaft 252 is horizontally disposed and extends through the housing walls. The shaft is suitably journalled in these walls to be freely rotatable and is connected to a suitable power source (not shown) to be rotated thereby. Clockwise rotation of the wheel is preferred. The clockwise rotation of the wheel is counter to the downward flux of the material and thus is least disruptive thereof and least disrupted thereby.

The wheel 250 has a pair of side faces 254 and 256 and a rim 258 connecting these two faces. A multiplicity of circumferentially disposed ladle-shaped chambers 260 are defined in the wheel to extend axially thereof and which are located adjacent, but spaced from, the rim 258. Each chamber has an inner wall 262 which is arcuate and positioned so that the walls 262 of the multiplicity of chambers define a generatrix of a circle which is concentric with the circular rim 258. The chambers each have a planar top wall 264 which is essentially straight and skewed with respect to a radial direction of the wheel to lie on a non-diametric secant of the wheel 250. The inner and outer walls are connected by a parabolically-shaped wall 266 which has a bulge 268 in the outermost section thereof. The chambers are open-ended and scoop out material from the reservoir as the wheel 250 turns.

As en empty chamber is immersed in the reservoir, the material is sufficiently fluent to move into the chamber via both empty ends thereof. The chambers are suitably sized, the rotational velocity and continuity of the rotation of the wheel is selected, and the depth of the reservoir is adjusted via adjustment of the influx timing and rate through the housing entrance, so that, upon emerging from the reservoir, the chambers will all contain roughly the same charge of material. As the wheel rotates, some of the material will drop out of the chambers, and thus the chambers will have charges of varying size.

A pair of L-shaped support brackets 300 are removably mounted on the bracket 220 by bolts 320 or the like. Each of the brackets 300 includes a long leg 304 and a short leg 306 with elongate bolt receiving slots 308 defined in the leg 306. The bracket 300 can be moved so that the position thereof relative to the wheel 250 can be varied.

A pair of L-shaped wiper brackets 320 are releasably mounted on the brackets 300 by bolts 321 or the like. Each of the brackets 320 includes a long leg 322 and a short leg 324 with the short leg extending through the support bracket 220 and having a bevelled edge 326 thereon.

The bevelled edges form wipers which are located on each side of the wheel to flushly engage the wheel sides 254 and 256. The bevelled edges of the wipers are preferably slanted at about 45° with respect to the horizontal, and the chamber top walls 264 are preferably oriented with respect to the chamber inner walls 262 to form an angle of about 45° therewith. Thus, as a chamber moves past a wiper-defining bevelled edge, an angle is formed which is close to a right angle. Efficient removal of material from the ends of the chamber is thus effected.

The bracket long legs 322 have faces 330 which abut the wheel to seal the chambers in an air-tight manner. The brackets 300 are located to securely abut the brackets 320 against the wheel. Removal of the brackets is easily effected by removing the brackets 300 from the bracket 220, then removing the brackets 320 from the brackets 300.

The bracket long legs obstruct the chambers in an air-tight manner and are biased against the wheel surfaces with a constant and steady pressure which is sufficient to insure airtightness of the rubbing engagement between the bracket leg faces and the wheel without inducing undue wear on the bracket faces or unduly inhibiting rotation of the wheel. As just-described, the wipers remove excess material, and, without such excess material removal, some of the material may become lodged between the wheel and the bracket leg faces and be crushed. Preferably the bracket legs are steel or other such material. Such granular material not only is wasted, but may abrade both the wheel and the brackets, thereby reducing the life and effectiveness of those elements.

A pair of axially aligned conduit attaching means 350 and 352, respectively, are attached to the brackets 300 and 320 to extend horizontally away from the wheel 250. An air inlet conduit 354 is fluidly connected to member 350 and a material transport conduit 356 is fluently attached to member 352 for conveying the material to a suitable location. Air from a suitable source (not shown) is directed to the chambers 260 via conduit 354 and member 350. A vent means 360 is mounted on the brackets immediately behind (in a clockwise direction of wheel rotation) the member 354. As the brackets cover the chambers in an air-tight manner, air conducted into the chamber via air line 354 will pressurize that chamber. The air passes through the chamber and into conduit 356 carrying with it the material contained within the chamber. As the chamber contains a specific quantity of material, the amount of material pulsed into conduit 356 from each of the chambers is an accurately metered quantity.

The chamber may not completely vent into outlet line 356 and may thus move beyond the material transfer point in line with the aligned conduit 354 and 356 still under an excess pressure. This excess pressure is removed via vent means 360.

The operation of the metering device 200 is evident from the above-description and will thus only be briefly presented. The rotation of the wheel 250 can be continuous, sequential, or continuous with a dwell period, as suitable. In any event, the chambers 260 are each filled from both ends thereof to overflowing as they are moved through the reservoir, and some of the material spills out as the wheel rotates the overfilled chambers upwardly out of the reservoir. By loading the chambers from both sides, complete loading of the chambers is insured. The level of the reservoir is maintained so that the top surface thereof is always located below the axis of rotation of the wheel and at a location selected to insure proper spillage rates from the chambers. By moving upwardly through the reservoir, the ladle-shape of the chambers is fully utilized in the scooping action. Thus, gravity assists in the loading of the chambers.

The wipers on both sides of the wheel remove excess material, and the quantity of material remaining in each chamber is thus uniform, and hence accurately metered. The chambers are then moved between the bracket legs and are closed in an air-tight manner. Each chamber then is sequentially moved into alignment with the conduits 354 and 356 whereat a blast of air, or other suitable gas, is directed into the interior of the chamber. The wheel rotates continuously and permits the full charge of materials to be exhausted into line 356 via member 352 by the gas moving from conduit 354 through chamber 260 and into the line 356.

Continued rotation of the wheel 250 then aligns the material exhausted chamber with vent means 360, whereat any excess unexhausted gas still contained in the chamber is vented therefrom. Continued rotation of the chamber brings the chamber back into contact with the reservoir, and the above-described process reoccurs. Any material not exhausted from the chamber simply remains in the chamber and forms part of the next charge in the chamber. However, the sequential operation of the elements can be adjusted to prevent such residue, as the presence thereof changes the volume of the metered charges delivered by the device 200. If these charges must be accurately controlled, the existence of such residue is, of course, undesirable, but as just discussed, can be prevented by adjusting the elements of the device 200 and the sequence of operation thereof.

The just-described process is repeated as often as desired and at a suitable rate to produce the desired rate of material flow through conduit 356. The conduit 356 can also be connected to a suitable suction means to assist in conveying material through that conduit. The suction will thus work in conjunction with the air pressure produced via conduit 354 to move the material through conduit 356 to the desired location.

The device 200 is amenable to systems involving several types of power. Thus, the wheel 250 can be rotated using electric motors, internal combustion engines, or the like.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A device for conveying granular material comprising:
   a housing having a partition dividing said housing into two compartments, a first one of said compartments having a material entrance defined therein;
   an induction wheel rotatably mounted on said housing, said wheel being essentially upright and having a plurality of elongate open-ended chambers defined therein, said wheel passing through said partition to be located partially in each of said compartments;
   a pair of L-shaped mounting brackets, each bracket having one leg thereof being movably mounted on said partition and having a second leg oriented adjacent to and essentially parallel with one face of said induction wheel, said brackets being located in the other of said pair of compartments;
   a pair of wipers, each wiper being mounted on one of said mounting bracket second legs to be pressed against one of said induction wheel faces, each wiper being L-shaped and having one leg thereof mounted on said mounting bracket second leg and having the other leg thereof extending through said partition into said first compartment, each of said wiper other legs having a beveled edge located to be adjacent to one of said wheel faces and located so that said wheel passes said wiper beveled edges to gently remove excess material from the ends of said chambers without damaging that removed material, said wiper beveled edges being shaped to define a material escape path over which said gently removed material passes;
   said wiper one legs each forming a sealing means sealingly covering said chamber ends in a secure manner, said sealing means being integral with said wiper to be located so that a chamber on said induction wheel passes said wiper prior to passing said sealing means, said wiper removing excess material from adjacent the ends of a chamber before such chamber is sealed by said sealing means so that material does not interfere with any seal formed between said sealing means and said chamber ends such that said chambers are securely closed to minimize loss of any gas introduced into said chambers for moving material out of said chambers;

adjustment means movably attaching each of said mounting brackets to said partition, each of said mounting brackets being movable toward and away from said wheel via said adjustment means so that each of said wipers are movable independently of the other wiper;

gas introducing means connected to said sealing means to introduce gas from a source into a chamber; and material transport means connected to said sealing means to receive gas and material from said chambers for transporting said material away from said induction wheel.

2. The device defined in claim 1 wherein said induction wheel has a rim and said chambers are ladle-shaped and are mounted in a circle which is concentric with the rim of said induction wheel, said chambers each having a planar top wall and an inner wall which is oriented at an angle of about 45° with respect to said top wall.

3. The device defined in claim 1 wherein each wiper bevelled edge is oriented at an angle of about 45° with respect to the horizontal.

4. The device defined in claim 1 further including a pressure venting means mounted on one of said wipers adjacent to said gas introducing means.

* * * * *